United States Patent
Burwell et al.

[11] Patent Number: 5,174,814
[45] Date of Patent: Dec. 29, 1992

[54] RETRACTABLE MARKER PEN AND INKS THEREFOR

[75] Inventors: Ann P. Burwell, Natick; Lewis H. Johnson, Mansfield; Richard Grandoff, Sandown, all of Mass.

[73] Assignee: Dennison Manufacturing Company, Framingham, Mass.

[21] Appl. No.: 541,008

[22] Filed: Jun. 20, 1990

[51] Int. Cl.⁵ .................. C09D 11/00; B43K 5/16
[52] U.S. Cl. .................. 106/19 R; 106/19 F; 401/108; 401/109
[58] Field of Search ............ 106/19, 22; 401/109, 401/108; 252/301.16

[56] References Cited

U.S. PATENT DOCUMENTS

| | | | |
|---|---|---|---|
| 3,637,316 | 1/1972 | Bross | 401/198 |
| 3,912,520 | 10/1975 | Miyajima et al. | 106/32 |
| 4,077,807 | 3/1978 | Kramer et al. | 106/23 |
| 4,153,593 | 5/1979 | Zabiak et al. | 106/26 |
| 4,269,525 | 5/1981 | Melikian | 401/108 |
| 4,540,300 | 9/1985 | Midorikawa | 401/108 |
| 4,702,742 | 10/1987 | Iwata et al. | 106/22 |
| 4,711,592 | 12/1987 | Gregory | 401/108 |
| 4,759,650 | 7/1988 | Granoff | 401/108 |

Primary Examiner—William R. Dixon, Jr.
Assistant Examiner—Helene Klemanski
Attorney, Agent, or Firm—Barry D. Josephs

[57] ABSTRACT

Retractable marker pens and ink formulations for marker pens. The ink formulation has particular utility as a fluorescent ink for highlighting text or print. The formulation reduces the rate of ink evaporation from conventional felt, fiber or plastic marker tips. This property makes the ink especially suitable for use in retractable marker pens which do not normally employ a separate tight fitting cap or a lint guard to protect the marker tip from ink evaporation when the marker pen is in non-use. The ink formulation exhibits excellent flow characteristics to conventional felt, fiber or plastic marker tips over a wide range in tip widths. The ink does not leak from the tip and does not penetrate paper so as to obscure text or printed material on the opposite side of the paper. The ink is composed of a fluorescent dye, selected from methine, xanthene and anthraquinone dyes dissolved in a multicomponent solvent system. The solvent system is preferably a four component system composed of diethylene glycol, propylene glycol, 2-pyrrolidone and demineralized water.

17 Claims, 2 Drawing Sheets

RETRACTABLE MARKER PEN AND INKS THEREFOR

FIELD OF THE INVENTION

The present invention relates to a fluorescent ink formulation for retractable highlighting marker pens. The present invention particularly relates to an ink formulation for retractable highlighting marker pens to reduce the rate of ink evaporation from the marker tip.

DESCRIPTION OF THE PRIOR ART

Marking pens and in particular highlighting pens which are used to highlight text or printed material are in common use. The preferred inks employed in highlighting marker pens utilize a fluorescent dye which gives the ink a pleasing glow-like appearance when it is coated on paper. These marking instruments typically have a tip which may be of felt, plastic or fibrous materials such as nylon, acrylic or polyester fiber. The marking tip is generally larger and wider than tips employed in ball point or fine tip, fiber or plastic writing pens. Marker pens typically have tips between about 1/16 to ⅜ inches in width. These marker pens, which are widely available, commonly have a tip which is not retractable and the pen is fitted with a removable cap which the user must remove to expose the marker tip. The user replaces the cap over the marker tip after use to prevent ink from evaporating from the tip.

The inks employed in highlighting marking pens are typically composed of a dye dissolved in a glycol solvent and water. These ink formulations have the disadvantage in that they evaporate quickly from the marker tip, thus, the marker tip begins to dry out within several hours if it is left exposed to the environment without the protection of a tightly fitting cap. However, as long as the user does not leave the marker tip exposed to the environment for long periods of time and remembers to place the tightly fitting cap over the marker tip after use, premature evaporation of ink from the marker can be reduced and the life of the marking instrument extended.

Applicant recognizes that there has been a longstanding interest in producing marking pens having retractable tips so that the marker pen may be placed in a shirt pocket without requiring the attachment of a separate protective cap to the pen. Although retractable ball point pens are commercially available, the design of the retractable wide tip marker pen has proved to be more difficult. Prior art designs for retractable marker pens have either proved to be too costly to manufacture or do not sufficiently prevent external materials, such as lint or fibers, from contacting the marker tip when the pen is in the retracted mode and placed in a shirt pocket.

One attempt to produce a retractable marker pen is disclosed in U.S. Pat. No. 4,269,525. The retractable marker pen shown in this reference has a shield mechanism (16) which is a small disk located at the head of the barrel of the pen designed to close over and protect the marker tip (14) after it has been retracted. The disk (16) however has a number of slit openings (17) through which air can pass even when the disk is closed. These slit openings allow ink to evaporate gradually from the tip even when the tip is in the retracted mode. Thus disk (16) does not completely protect the tip from gradual ink evaporation. The marker pen shown in this reference does not utilize a separate tight fitting cap to prevent ink from evaporating. U.S. Pat. No. 4,269,525 is herein incorporated by reference.

U.S. Pat. No. 4,759,650, which is commonly assigned with the present patent application, discloses a design for an economical and practical retractable marking pen which does not employ a separate and replaceable tightly fitting cap over the marker tip. In the design disclosed in the '650 Patent, a pair of lint guard flaps, which are integrally molded to the inside surface of the pen casing, automatically covers most all of the surface of the marker tip after the tip is retracted but does not prevent trace amounts of ambient air from reaching the retracted tip.

The present application relates to a marker pen which omits any cap or lint guard, thus leaving the marker tip exposed to ambient air even when retracted. It thus becomes critically important to develop and utilize ink formulations which will evaporate slowly under such conditions.

Accordingly, it is an object of the invention to provide a nontoxic, fluorescent ink formulation for retractable marker pens which do not utilize a removable, tightly fitting protective cap, or a lint guard, over the marker tip.

It is an object that the fluorescent ink be suitable as a highlighting ink to highlight text and printed material on paper without obscuring the text and without penetrating to the underside of the paper.

It is an important objective of the invention that the ink formulation for the retractable marker pens has the property that reduces rate of evaporation of ink from the marker tip to permit usage of the pen even if it is left in storage for up to two years prior to first use. It is a related object that the present ink formulation have particular utility with retractable marker pens having marker tips of felt, fibrous or plastic materials having widths of between about 1/16 to about ⅜ inches.

SUMMARY OF THE INVENTION

The present invention relates to a retractable marking pen in which the marker nib is not protected by a removable cap or lint guard, and to an ink for use in such pen. The ink formulation of the invention meets a number of physical property requirements simultaneously. The present ink formulation is designated for use in connection with retractable marker pens for highlighting text or printed material. These pens normally employ a lint guard flap or other self-closing mechanism which covers most of the exposed surface of the marker tip when the marker is retracted into the barrel of the pen. However, the inks of the invention are designed for use with a retractable marker pen which omits such lint guard, thus substantially exposing the tip of the marker nib even when the tip is retracted. Thus one important advantage of the present ink formulation is that the rate of ink evaporation from the marker tip through any air space present between the marker tip and the external environment is greatly reduced. This permits first use of the marker pen even if it has been in non-use for up to two years. Specifically the present ink formulation will markedly retard the rate of evaporation of ink from tips of marker pens having widths typically between about 1/16 to about ⅜ inches irrespective of whether the tip is of felt, plastic or fiber, e.g., acrylics, nylon or polyester fiber. The present ink formulation will still permit a shelf life of up to two years for retractable marker tips having widths between 1/16 to ⅜ inches and having cross sectional areas of up to about 0.15 sq. inches even though the marker tip may be exposed to the external environment when the marker is in the retracted mode.

Additionally, the present ink formulation must also exhibit excellent ink flow properties so that ink is fed smoothly to the nib without interruption during use. The ink must be capable of flowing smoothly to the nib even though the retractable marker has been left in storage for up to two years. The present ink formulation also permits constant ink flow during use for at least about 600 feet of marking using a nominal cartridge barrel which hold an ink supply of about 1.5 cubic centimeters. The cartridge barrel contains conventional porous filler material such as polyester fiber which promotes proper capillary flow of ink to the marker tip. The present ink formulation has the property that it dries quickly on paper within 1-2 seconds. It has excellent washability characteristics which permit removal of the ink from skin and fabric on washing. The ink exhibits no discernible strike-through when used on paper, that is, does not penetrate through typical 20-30 lb., or heavier, paper to the extent that it would block or interfere with the legibility of print on the opposite side of the paper. In fact, if the ink is used to mark one side of the paper and the paper reversed, the marking would not be discernible on the reverse side of 20 lb. paper unless one would hold the paper up to a strong light. The present ink formulation exhibits the required flow properties but yet will not leak from conventional marker tips irrespective of whether the tip is of conventional fabric, fiber or plastic materials for marker tips of widths between 1/16 to ⅜ inches and of cross sectional area up to about 0.15 sq. inches. The present ink formulation exhibits excellent highlighting properties when used to mark or highlight printed text on paper. The ink, when used to mark or highlight text enhances the readability of the text and has a pleasing, fluorescent, glow-like, appearance.

The present ink formulation additionally has proved to be nontoxic should the ink come into contact with human skin or should small amounts of the ink contact the eye or be orally ingested.

The ink formulation of the present invention, which achieves these objectives and exhibits all of the aforementioned properties, is composed of a homogeneous solution of fluorescent dye dissolved in a solvent system. The fluorescent dyes determined to be preferred for the ink formulation of the present invention are selected from the chemical class of methine, xanthine and anthraquinone dyes. The class of methine dyes was determined to be preferred.

The solvent system of the present invention for these classes of fluorescent dyes is a multicomponent solvent system composed of 1) diethylene glycol, 2) propylene glycol, 3) 2-pyrrolidone and 4) demineralized water.

The dye typically comprises less than about 2 percent by weight of the ink. The preferred ink formulation contains diethylene glycol in amounts between about 20 to 40 percent by weight, more preferably about 40 percent by weight; 2-pyrrolidone in amounts between about 3 to about 20 percent by weight, more preferably about 10 percent by weight and propylene glycol in amounts between about 3 to 20 percent by weight, more preferably about 10 percent by weight with demineralized water making up the balance of the solution. A preservative to prevent bacterial growth is preferably added to the final ink formulation. The preservative, may, for example be chloroacetamide which may be added typically in amounts of less than ½ percent by weight of the final ink formulation.

BRIEF DESCRIPTION OF THE DRAWINGS

The above and additional objects are satisfied using the retractable marker pen and ink described in the following detailed description of the preferred embodiment, to be taken in conjunction with the drawings in which.

DESCRIPTION OF THE PREFERRED EMBODIMENT

Figure 1:
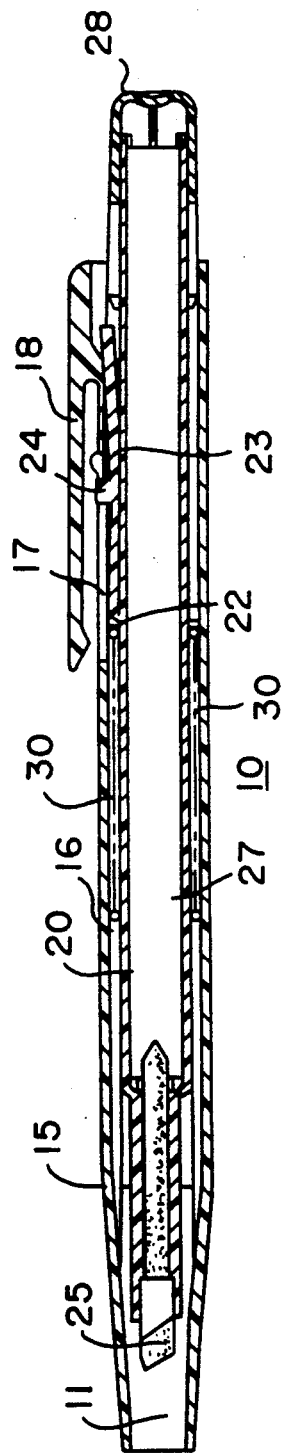
FIG. 1 is a sectional view of a marker pen while in its retracted configuration.
Figure 2:
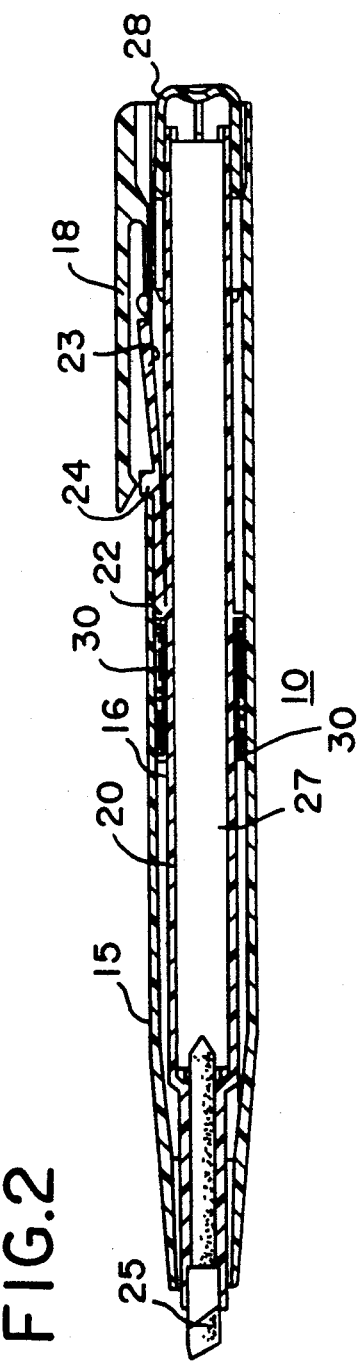
FIG. 2 is a sectional view of a marker pen while it is writing configuration.
Figure 3:
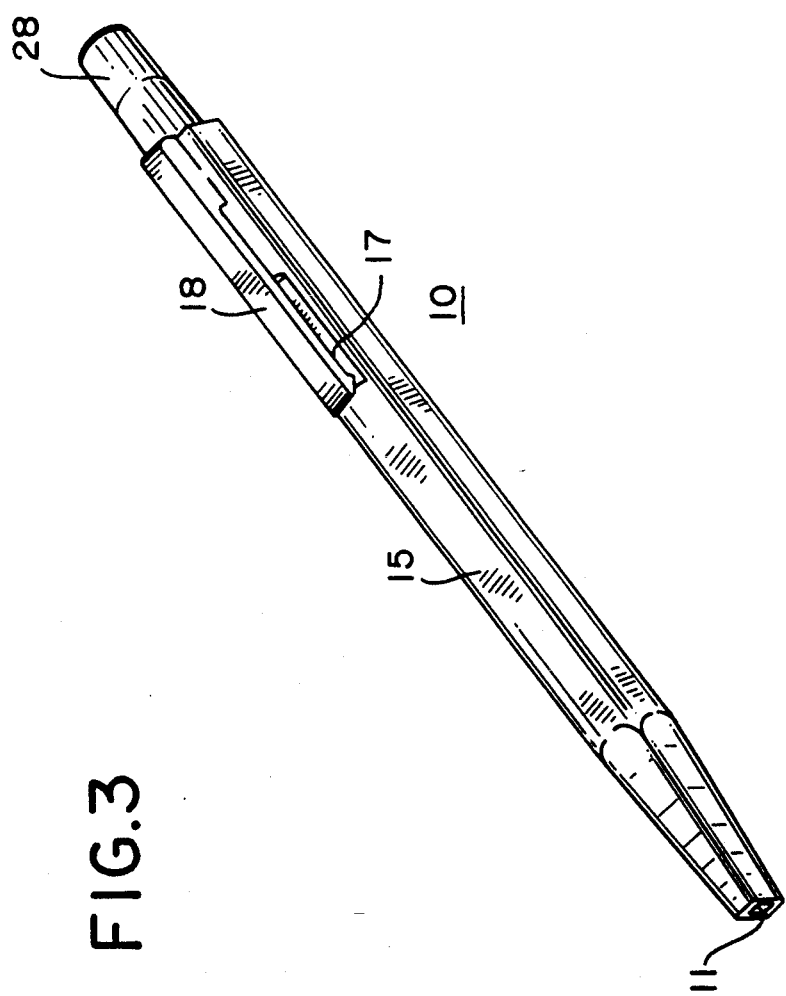
FIG. 3 is a perspective view of the marker pen of FIGS. 1 and 2.

Reference should now be had to FIGS. 1 and 2 which show in section a retractable marker pen 10 while in its retracted and writing configurations, respectively, and to the perspective view of FIG. 3. Marker pen 10 houses an integrally molded cartridge assembly 20 which carries marker nib 25 in its front end and a filler 27 along most of its length to hold a supply of ink. A plug 28 seals the rear end of the cartridge. Pen 10 also includes a compression spring 30 which fits in back of a shoulder 16 in the pen body 15, and in front of another shoulder 22 in the cartridge assembly 20. Cartridge assembly carries an integrally formed, cantilevered retract arm 23 including a button 24.

The user can project the marker tip into the writing position by pressing on the plug 28, compressing the spring 30 and advancing the cartridge 20 until the arm 23 (which presses upwardly against the marker body 15) springs into a slot 17 in the body 15, whereupon the end of arm 23 abuts against the rear of slot 17. Slot 17 is located below a portion of the clip 18, which clip may be integrally formed with body 15 for economy of manufacture. When the user wishes to retract the cartridge 20, the clip 18 is depressed pushing down on button 24, allowing arm 23 to clear slot 17 so that the compression spring causes the retraction of cartridge 20.

It will be seen that the marker nib 25 is neither covered by a cap nor protected by a lint guard in the marker 10 of FIGS. 1-3, but rather is exposed to ambient air. When the marker is in its retracted configuration, the tip of nib is preferably sufficiently recessed from the frontal opening 11 of marker 10 that the marker ink will not stain clothing fibers when, for example, the marker is held in a shirt pocket. Illustratively, marker nib is retracted by about one centimeter when in its retracted position. Furthermore, by providing substantial clearance between the marker nib 25 and the marker body 15, even long fibers will tend to pass by the nib.

The preferred ink formulation for use with the marker pens of the invention is composed of a fluorescent dye dissolved in a solvent system. Dyes which give a glossy, fluorescent, appearance are available in different colors.

A common nomenclature used by dye chemists is by color index name prescribed by the American Association of Textile Chemists and Colourists which appears in the well known treatise: Colour Index, 3rd Edition (in five volumes), published by the Society of Dyers and Colourists and the American Association of Textile Chemists and Colorists, Research Triangle Park, N.C.

(1971). The given colour index name, e.g., Basic Yellow 40, designates a specific dye.

Applicant has determined that fluorescent dyes preferred for the ink formulation of the present invention are selected from the chemical class of methine dyes, xanthene dye and anthraquinone dyes.

The most preferred class of fluorescent dye is selected from the methine class. A specific methine fluorescent dye which has been determined to be very suitable for the ink of the present invention has the color index name Basic yellow 40. (Nomenclature in accordance with the *Colour Index*, supra, Vol. 1 at page 1618). This dye is available commercially under the tradename CARACRYL BRILLIANT FLAVINE 10 GFF from the Carolina Color and Chemical Company, Charlotte, N.C.

A preferred fluorescent dye from the xanthene class determined to be very suitable is Basic violet 10 (See the *Color Index*, supra, Vol. 1 p. 1651). The specific chemical name for this dye is rhodamine B (tetra ethyl rhodamine). A preferred fluorescent dye from the anthraquinone class is Solvent green 7. (See the *Colour Index*, supra, Vol. 3, P. 3632). The chemical name for this dye is pyranine.

The solvent system for the ink formulation of the present invention using the foregoing classes of fluorescent dyes is preferably a four component solvent system. The preferred four component solvent system is 1) diethylene glycol, 2) propylene glycol, 3) 2-pyrrolidone and 4) demineralized water.

Applicant has determined that this particular solvent system, when used to solvate the above referenced fluorescent dyes produces a fluorescent highlighting ink which exhibits a host of important properties simultaneously which makes the present ink formulation uniquely suited for use in retractable marker pens. Importantly, the ink formulation of the present invention, utilizing the foregoing four component solvent system, has a much reduced rate of evaporation from the marker tip than conventional highlighting marker inks.

Applicant has determined that the present ink formulation utilizing the four component solvent system, unexpectedly produces an ink which exhibits a 50 percent reduction in the rate of evaporation under ambient conditions when compared with conventional highlighting solvent based ink formulations. Conventional highlighting ink formulations may typically be composed of a dye dissolved in a solvent which may be a glycol solvent admixed with water but do not employ the multicomponent solvent system such as Applicant's formulation. It is surprising that there can be so great a reduction in the rate of evaporation of ink with the present solvent system when compared with that of conventional highlighting inks. Conventional highlighting inks utilizing a methine dye, such as Basic Yellow 40, may utilize a glycol solvent, e.g., ethylene glycol or propylene glycol. The component 2-pyrrolidone as described in the *Condensed Chemical Dictionary*, 10th Edition, edited by Gessner G. Hawley, Van Nostrand Reinhold Company, is a known plasticizer in coalescing agents for acrylic latexes in floor polishes; a solvent for polymers, insecticides, polyhydroxylic alcohols, sugar, iodine and specialty inks. Applicant has determined that the host of physical properties required of the present ink formulation is surprisingly best achieved using the aforementioned four component solvent systems. Although each of the solvents separately are known to be among the wide list of solvents for many common dyes, Applicant believes that the combination of the four components in the system herein described produces unexpected advantages.

Surprisingly not only does the ink formulation of the present invention reduce the rate of ink evaporation up to 50 percent when compared to conventional marker inks, it also exhibits the high degree of flowability, resistance to leakage from conventional marker tips and dries within one to two seconds when coated on paper. The present formulation also prevents penetration of the ink through to the underside of conventional 20 to 50 lb paper. It has proved difficult to formulate a highlighting marker ink which exhibits so great a reduction in evaporation rate, while yet meeting all the other requirement necessary for a commercial highlighting ink for use in retractable marker pens.

As aforementioned it is an important objective of the present invention that the ink formulation be well suited for use in retractable highlighting marker pens. The ink for use in the retractable marker pens of the invention must show a marked reduction in rate of evaporation when exposed to ambient conditions than do conventional marker inks. Conventional inks are not as desirable for use in retractable marker pens because they simply dry out too quickly and do not yield the required shelf life. The present formulation utilizing the preferred multicomponent solvent systems with conventional highlighting fluorescent dyes achieves all of the required objectives and unexpectedly produces an ink formulation which is ideally suitable for retractable highlighting markers.

Importantly, the ink of the present invention has also proved to be nontoxic should it come into contact with human skin or should small amounts of the ink contact the eye or be orally ingested.

Preferred formulations A to D are illustrated in Table 1. Formulations A to C employ the fluorescent dye Basic Yellow 40. Formulation D utilizes the fluorescent dye Basic violet 10. The preferred formulations utilize a four component solvent system as shown. The most preferred ink formulation is formulation A which has a solvent composition as shown in Table 1. It has been determined that for favorable results using the dyes and solvent system herein, the ink formulation of the invention should have a viscosity between about 4 and 8 centipoise and a surface tension between about 40 and 50 dynes/cm. It is not understood why viscosity and surface tension in this range gives best results with the ink formulation of the invention.

Formulation A has the highest content of diethylene glycol, about 40 percent by weight of the total formulation and a composition of 2-pyrrolidone of about 10 percent by weight of the final formulation. This particular formulation has proved to give the best results in terms of achieving the least rate of evaporation and best flowability of the ink through the marker tip without causing any noticeable leakage of ink from the marker tip. Formulation B utilizes a lesser amount of diethylene glycol and a lesser amount of propylene glycol than formulation A but a slightly higher amount (16 percent by weight) of 2-pyrrolidone. Formulation C utilizes a lesser amount of diethylene glycol, namely 32.5 percent by weight, a smaller amount of 2-pyrrolidone, namely 3.75 percent by weight and a higher amount of propylene glycol, namely 16.25 per cent by weight, when compared to the most preferred formulation A. Formulations B and C achieve all the objectives of the invention.

Formulation D which employs an alternative preferred fluorescent dye, namely Basic violet 10 has a diethylene glycol content of about 30 percent by weight, a propylene glycol content of about 30 percent by weight and a content of 2-pyrrolidone of about 5 percent by weight. Although the formulations B, C and D may advantageously be used as a final ink formulation for retractable marker pens, it has been determined that the rate of evaporation of ink from the marker tip is increased somewhat by about 10 to 20 percent, when compared to the rate of evaporation of ink from the most preferred formulation A. Consequently, the formulations B, C and D while advantageous, are not as preferred as formulation A. In practice it has been found extremely difficult to arrive at the aforementioned multiple solvent system for fluorescent highlighter marker dyes which exhibit all the required properties simultaneously for use in retractable marker pens.

TABLE I

|  | A Wt % | B Wt % | C Wt % | D Wt % |
|---|---|---|---|---|
| DYE: |  |  |  |  |
| Basic Yellow 40 (fluorescent methine dye) | 0.75 | 0.75 | 0.75 | — |
| Solvent red 49 (fluorescent xanthene dye) | — | — | — | 0.5 |
| SOLVENT SYSTEM: |  |  |  |  |
| Diethylene Glycol | 40.00 | 32.50 | 32.50 | 30.0 |
| 2-Pyrrolidone | 10.00 | 16.25 | 3.75 | 5.0 |
| Propylene Glycol | 10.00 | 3.75 | 16.25 | 10.0 |
| Demineralized Water | 38.95 | 46.45 | 46.45 | 54.2 |
| PRESERVATIVE: |  |  |  |  |
| Chloroacetamide | 0.30 | 0.30 | 0.30 | 0.30 |
| TOTAL | 100.00 | 100.00 | 100.00 | 100.0 |
| Viscosity, centipoise | 6.62 | 4.4 | 5.5 | 4.0 |
| Surface tension, dynes/cm | 45 | 45 | 43 | 46 |

Each ink formulation shown in Table I was prepared by first blending the solvents, diethylene glycol, 2-pyrrolidone and propylene glycol together at ambient temperature in the weight proportion shown. These solvents are readily miscible in one another and as a result, were easily blended by quickly stirring for a few seconds without heating. An amount of water, preferably demineralized water was set aside in the proportion shown in the Table 1 for each formulation and the blended solvents were then added to this supply of demineralized water. The four component solvent mixture was then subjected to heating, for example, by placing the vessel containing the solvent system in a hot water bath maintained at about 130° F. The solvent system was then mixed for about 30 minutes using a conventional laboratory mixer, whereupon a homogeneous solution was obtained. At this time the powdered fluorescent dye was added to the solvent solution in the weight proportion shown in Table I for the respective formulation. The mixture was then mixed at a constant water bath temperature of about 130° F. for another 15 to 30 minutes. At this time, a powdered dye was completely dissolved in the solvent system and a homogeneous solution resulted. A preservative was added, for example, chloroacetamide in the amount shown and the entire solution again mixed for an additional 15 to 20 minutes while maintaining the mixture temperature at about 130° F. This preparation and mixing procedure may be effectively utilized in preparing large batches of ink as well. However, in preparing large amounts of ink at one time, it could be desirable to subject the final ink solution to filtering if necessary to remove any minor amount of residual particulate material that may not have gone into solution. It will be appreciated that the present ink formulation may be used in connection with various retractable marker pens, irrespective of the size and width of the marker tip with conventional marker materials of felt, fiber or plastic. The same inks could be used with both regular and fine line markers utilizing the mechanical design of FIGS. 1-3. It will be recognized that the present ink formulation may be used in all of these applications wherein it is desirable to use a highlighting marker ink which exhibits extremely good flowability characteristics and is slow to evaporate from the marker tip when the tip is exposed to the ambient environment. Accordingly, the invention is not intended to be limited by the specific examples herein, but rather is defined by the claims and equivalent thereof.

We claim:

1. A retractable marker pen, comprising
  a marker body;
  a cartridge housed in said marker body, said cartridge carrying a writing nib and a supply of ink in communication with said nib; and
  a mechanism for advancing and retracting said cartridge and nib so that the nib alternately projects from and is recessed within the marker body, wherein said nib is not protected by a cap or lint guard while in its recessed position;
  said ink comprising a fluorescent dye dissolved in a solvent system, the solvent system comprising diethylene glycol, propylene glycol, 2-pyrrolidone and water,
  wherein the balance of constituents in said solvent system is selected to provide the properties of: slow evaporation of ink from the tip of said marker pen; good ink flow permitting use of the marker pen until the ink supply is substantially depleted; and low tendencies toward ink leakage and penetration of paper.

2. A marker as in claim 1 wherein the marker tip of said marker pen has a width of between about 1/16 to ⅜ inches.

3. A marker as in claim 1 wherein the fluorescent dye is selected from the group consisting of methine, xanthine and anthraquinone dyes.

4. A marker as in claim 1 wherein the fluorescent dye comprises a methine dye.

5. A marker as in claim 1 wherein the diethylene glycol comprises between about 20 to 40 percent by weight of said ink;
  2-pyrrolidone comprises between about 3 to 20 percent by weight of said ink; and
  propylene glycol comprises between about 3 to 20 percent by weight of said ink.

6. A marker as in claim 1 wherein the water is demineralized water.

7. A marker as in claim 3 wherein the fluorescent methine dye has the colour index designation Basic Yellow 40.

8. The marker of claim 1 wherein the fluorescent dye comprises tetra ethyl rhodamine.

9. The marker of claim 1 wherein the viscosity of said ink is between about 4 to 8 centipoise and the surface tension between about 40 to 50 dynes per centimeter.

10. The combination of a marker pen having a retractable marker tip and a supply of ink housed within the pen, said ink in communication with said marker tip, the marker tip selected from the group consisting of felt, fiber and plastic material, said marker tip having a width of between about 1/16 to ⅜ inches, the ink comprising a fluorescent dye dissolved in a solvent system, the solvent system comprising diethylene glycol, propylene glycol, 2-pyrrolidone and water, wherein the balance of constituents in said solvent system is selected to provide the properties of: slow evaporation of ink from the tip of said marker pen to provide a two year service life without a protective cap over the marker tip; good ink flow permitting use of the marker pen until the ink supply is substantially depleted; low tendencies toward ink leakage and penetration of paper.

11. The combination as in claim 10 wherein the fluorescent dye is selected from the group consisting of methine, xanthene and anthraquinone dyes.

12. The combination as in claim 1 wherein the fluorescent dye comprises a methine dye.

13. The combination as in claim 10 wherein the diethylene glycol comprises between about 20 to 40 percent by weight of said ink; 2-pyrrolidone comprises between about 3 to 20 percent by weight of said ink; and propylene glycol comprises between about 3 to 20 percent by weight of said ink.

14. The combination as in claim 10 wherein the water is demineralized water.

15. The combination as in claim 11 wherein the fluorescent methine dye has the colour index designation Basic Yellow 40.

16. The combination as in claim 10 wherein the fluorescent dye comprises tetra ethyl rhodamine.

17. The combination as in claim 10 wherein the viscosity of said ink is between about 4 to 8 centipoise and the surface tension between about 40 to 50 dynes per centimeter.

* * * * *